Jan. 15, 1957 S. P. KISH 2,777,790
METHOD OF MAKING REPRODUCTION FIXTURES
Filed Oct. 1, 1953 3 Sheets-Sheet 1
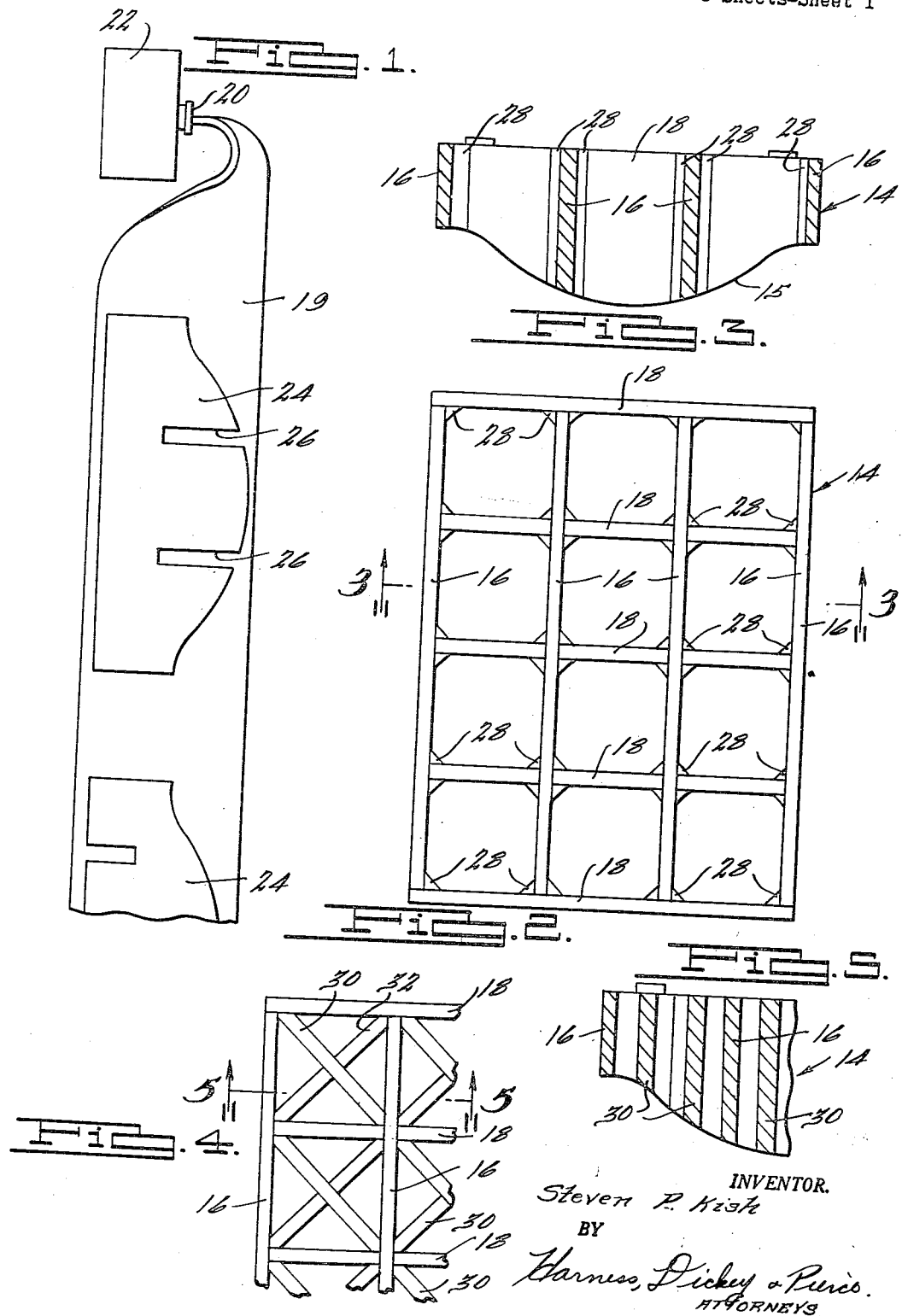
INVENTOR.
Steven P. Kish
BY
Harness, Dickey & Pierce.
ATTORNEYS.

Jan. 15, 1957
S. P. KISH
2,777,790
METHOD OF MAKING REPRODUCTION FIXTURES
Filed Oct. 1, 1953
3 Sheets-Sheet 2
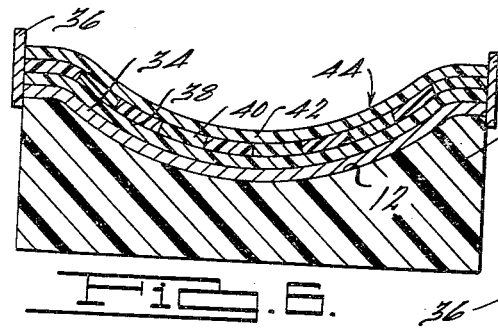
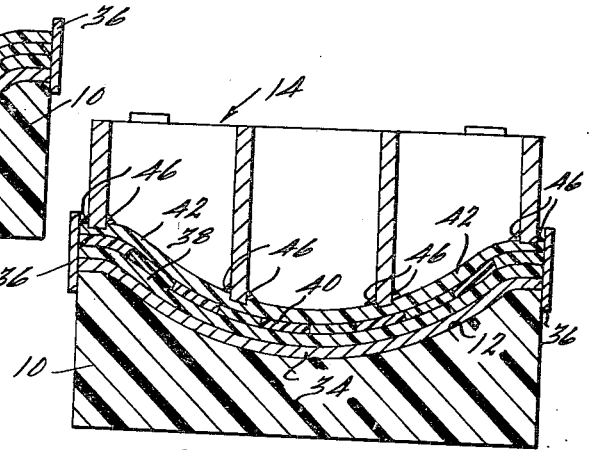
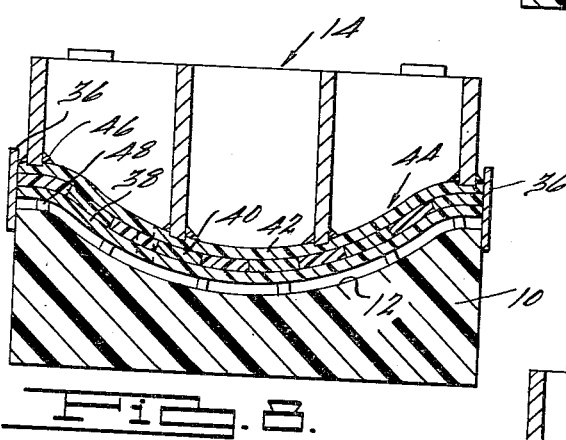
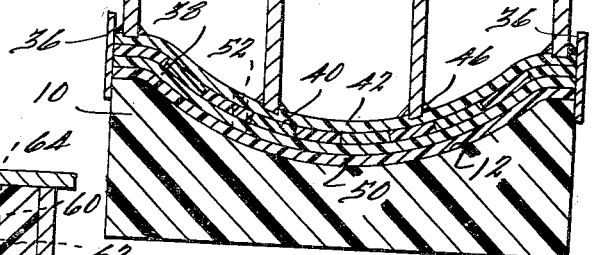
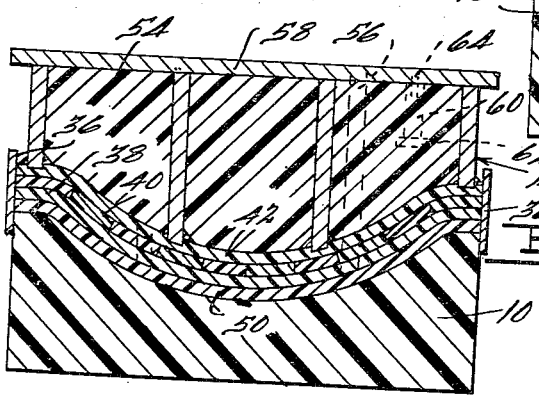
INVENTOR.
Steven P. Kish
BY
Harness, Dickey & Pierce
ATTORNEYS Jan. 15, 1957
S. P. KISH
2,777,790
METHOD OF MAKING REPRODUCTION FIXTURES
Filed Oct. 1, 1953
3 Sheets-Sheet 3
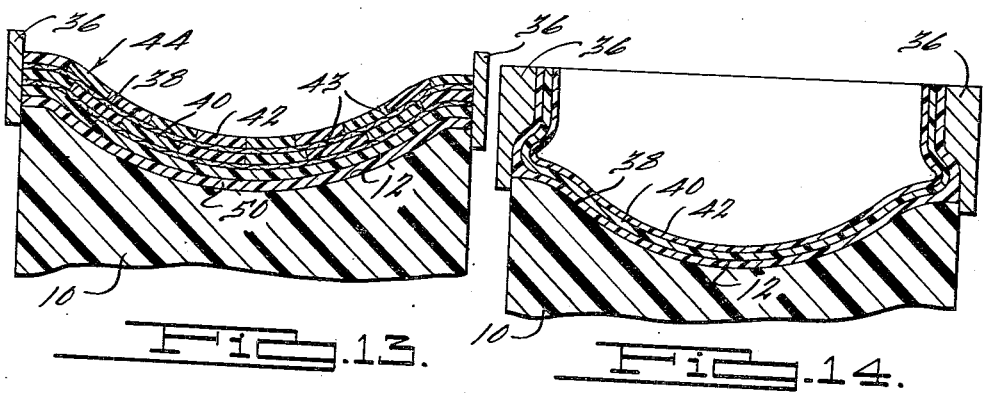
INVENTOR.
Steven P. Kish
BY
Harness, Dickey & Pierce.
ATTORNEYS.

United States Patent Office 2,777,790
Patented Jan. 15, 1957

2,777,790
METHOD OF MAKING REPRODUCTION FIXTURES

Steven P. Kish, Lansing, Mich.

Application October 1, 1953, Serial No. 383,438

1 Claim. (Cl. 154—110)

This invention relates to new and useful improvements in plastic articles such as reproduction fixtures and the like and to an improved method of making the same.

As suggested, the instant invention has general utility and can be used in the manufacture of a wide variety of plastic articles; however, it has particular utility in the manufacture of reproduction fixtures such as those used by the automotive and aircraft industry. In the case of the automobile industry, for example, the production of a new body style involves a number of expensive tooling operations. The first step in these operations is the preparation of a master model of each of the newly designed parts, and it usually is necessary to make a number of duplications of this model to assist in the manufacture of fixtures used in the production of stamping and forming dies and in connection with the production of parts from the dies. Thus, it is necessary to have model duplication for use by different tool and die makers, it is necessary to have die models for use in the machining of production dies, it is necessary to have spotting racks for checking and inspecting the die while it is being made, it is necessary to have checking fixtures for inspecting the mass-produced parts, and on occasions it is necessary to have assembly fixtures for positioning and holding parts in proper relation with respect to each other while they are assembled together or while stiffening and reinforcing ribs are welded or otherwise fastened thereto. All of these tools are generally referred to in the art as reproduction fixtures and they are so designated in this application.

The job of tooling up for a new body style in the automobile industry is a lengthy, time-consuming and expensive one. This is partly because of the larger number of tools required in the total operation and partly because of the tedious and time-consuming hand methods heretofore used in the manufacture of the tools. Dimensional stability is absolutely essential in all of the reproduction fixtures specifically referred to, and it is desirable that the fixtures retain their dimensional stability for long periods of time.

Recently various techniques for making reproduction fixtures of the type here under consideration have been proposed, and these constructions have proved to be preeminently satisfactory. The use of plastic in the manufacture of these fixtures has greatly shortened the time required for tooling up and has materially reduced the tooling cost. This invention was developed primarily as a new technique for making the fixtures and it materially reduces the time and expense involved still further.

In accordance with the foregoing it will be readily apparent that an important object of the present invention is to provide an improved plastic construction for reproduction fixtures.

Another object of the invention is to provide an improved construction for reproduction fixtures that materially reduces the time and expense involved in making the fixtures while maintaining adequate dimensional stability thereof.

Other objects and advantages of the invention will be apparent during the course of the following description.

In the drawings forming a part of this specification and wherein like numerals are employed to designate like parts throughout the same:

Fig. 1 is a diagrammatic view illustrating the manner in which elements of a reinforcing lattice framework embodying a part of the invention are made;

Fig. 2 is a plan view showing a lattice framework made from the elements illustrated in Fig. 1;

Fig. 3 is a transverse, sectional view taken on the line 3—3 of Fig. 2;

Fig. 4 is a fragmentary, top plan view showing a modified construction for the lattice framework;

Fig. 5 is a transverse, sectional view taken on the line 5—5 of Fig. 4;

Figs. 6–9 illustrate successive steps employed in the manufacture of a reproduction fixture according to the present invention;

Fig. 10 is a transverse, sectional view showing a modified construction for the fixture;

Fig. 11 is a top plan view of the shell construction embodying a part of the invention and illustrating the manner in which the shell is built up of successive layers of plastic resin material;

Fig. 12 is a view similar to Fig. 11 but illustrating a modified shell construction;

Fig. 13 is a transverse, sectional view taken on the line 13—13 of Fig. 12; and

Fig. 14 is a transverse, sectional view showing still another modified fixture construction embodying the invention.

Most fixtures of the type here under consideration must be capable of withstanding considerable handling and abuse. Also, these fixtures in many instances are kept for several years and when not in use they are stored in lofts and the like where they may be subjected to wide variations in temperature. Manifestly, it is necessary to make a fixture of this type as strong and as dimensionally stable as possible under all conditions of use.

By way of illustration a model duplication is shown in the drawing as a typical reproduction fixture, but it will be apparent that the methods and techniques here shown and described can be readily adapted to other reproduction fixtures. Before making the main body or shell of the model duplication, a female mold 10 is cast against the master model (not shown). This mold can be made in any suitable or desired manner but it preferably is made in accordance with the teachings of my prior application Serial No. 66,886, filed in the United States Patent Office December 23, 1948, now U. S. Pat. 2,682,111. A female mold produced in this manner has a contour surface 12 which accurately conforms to and negatively reproduces the contour surface of the model.

In the interest of strength and dimensional stability the fixture preferably is provided with a reinforcing lattice framework 14 comprising a plurality of suitably interconnected, longitudinal, and transverse members 16 and 18 respectively. In practice, the framework 14 may vary considerably in size and shape, as it should conform at least generally to the fixture with which it is intended to be used. Manifestly, these fixtures vary considerably in size and form and it therefore is necessary in each instance to adapt the framework to the particular fixture at hand. A framework of generally rectangular conformation in plan is shown in the drawings by way of illustration. Also, the undersurface 15 of the frame 14 preferably is made to conform at least generally to the contour surface 12 of the mold 10.

The lattice framework 14 can be fabricated of any suitable board material; however, it is preferred to make the frame from a suitable plastic resin. Any of a relatively large number of plastic resins can be used for this purpose. Epoxy resins, polyester resins, plastisol types of vinyl resins, and various phenolic resins are typical examples. In practice a suitable filler such as glass fibers or asbestos fibers are incorporated in the uncured resin, preferably in an amount sufficient to change the resin from a liquid to a pliable solid or mastic. The resulting resinous product can then be extruded in the form of a flat strip 19 through a die 20 from a suitable press 22 as illustrated diagrammatically in Fig. 1. A partially cured resinous strip produced in this manner is uniformly thick and it can be readily handled without breaking or otherwise damaging the resin mastic.

Preparatory to making the lattice framework 14, a template for each of the longitudinal and transverse frame members 16 and 18 is fashioned from cardboard or other suitable material, and various members of the frame are cut from the strip 19 of resin material using the templates 24 as guides (Fig. 1). The longitudinal and transverse members of the frame 14 can best be interconnected by interfitting slots, and to this end the templates 24 are slotted as at 26 as required to make the members interfit properly in the framework. After the several members 16 and 18 have been cut from the strip 19 they are fitted together to make the completed frame 14; and, if necessary or desirable, additional fillet strips 28 of the resin material 19 can be pressed into the corners of the lattice openings to further strengthen and reinforce the same. Any scrap material left over from the strip 19 is returned to the press 22 and re-used. After the members 16 and 18 and the strips 28 have been assembled in the manner described, the mastic resinous material is cured in any suitable manner as by placing the framework 10 in an oven and subjecting it to a sufficiently high temperature to complete the setting or curing of the material.

If necessary or desirable the lattice openings of the framework 10 can be additionally reinforced by diagonal crossed members 30 and 32, as shown in Figs. 4 and 5. These members 30 and 32 can be made of any suitable material but they preferably are made from the plastic resin sheet material 19.

The next step in the manufacture of the fixture is to place a layer 34 of a uniformly thick, flexible sheet material 34 on the contour surface 12 of the mold 10. Sheet wax is suitable for this purpose as is any of a relatively large number of known puttylike substances capable of being extruded or otherwise formed into a flat strip or sheet. Regardless of the particular material used in the sheet 34, however, the top surface of the mold 10 preferably is first covered with a suitable parting compound which permits the sheet to be readily removed therefrom, and the top surface of the sheet 34 also is covered with a parting compound for reasons hereinafter apparent. If necessary or desirable, upstanding side walls 36 can be provided at the sides of the mold 10 to box off and confine the surface 12. When side walls 36 are provided, the sheet material 34 is pressed gently into intimate contact with the surface 12 and then trimmed flush with the margins of the surface so that the edges thereof abut snugly against the walls.

Strips of uncured mastic resin material 19 are then laid side by side and in successive superposed layers on the sheet 34 with the strips in each layer overlapping the joints between the strips in adjacent layers; and as each strip is laid in place, the ends are trimmed to the margin of the surface 12 so that the edges of the strip fit snugly against the upstanding surrounding wall members 36. Three such layers 38, 40, and 42 are here shown but it will be readily apparent that a greater or lesser number of layers can be provided if necessary or desirable. The overlapping feature is desirable in order to interlock the layers 38, 40, and 42 securely together and to provide the tensile strength necessary to prevent the individual strips from being pulled apart. In Fig. 11 I show the strips in the bottom and top layers 38 and 42 disposed transversely of the die 10 and the intermediate layer 40 disposed longitudinally thereof. If desired, suitable reinforcing sheet material 43 such as wire mesh or the like can be interposed between adjacent layers 38, 40, and 42 as shown in Fig. 12. Also, in this connection it will be observed that in Fig. 12 I have shown the bottom layer 38 disposed transversely, the intermediate layer 40 disposed diagonally and the top layer 42 disposed longitudinally of the mold 10. As the resinous strips are laid in place, they are pressed gently against the subjacent surface so that the final resin composite is a relatively thick shell 44 of essentially uniform thickness which conforms more or less exactly to the surface contour 12 of the mold 10 and which is spaced from the surface 12 by the intervening sheet material 34. As the strips of resinous material are laid in place, they bond securely with the adjacent strips and in the case of two upper layers 40 and 42 with the strips in the subjacent layer so as to produce a substantially homogeneous, one-piece, resinous shell.

After the shell 44 has been laid and before the resinous material in the shell has set or cured the framework 14 previously prepared is superimposed thereon and preferably embedded slightly therein by pressing the frame gently against the top layer 42. If desired, fillet strips 46 can be laid along the lattice members 16 and 18 at the juncture of the members and the top layer 42 to secure the frame 14 additionally to the shell 44. The plastic shell with the reinforcing lattice framework attached is then removed from the mold 10 and the sheet material 34 is stripped away. Spacers 48 preferably made from the same resinous material as the shell 44 are placed on the mold surface 12. These spacers hold the shell 44 spaced slightly from the contour surface 12, and a facing layer 50 of plastic resin is then poured into the space between the shell 44 and the mold 10. This facing layer 50 can be the same plastic material used for the shell 44 or any plastic resin material that is compatible with and that will bond properly to the shell. The facing layer 50 can be introduced into the space between the mold and the shell in any desired manner. The usual procedure, however, is to drill two or more holes 52 and then pour the plastic material through one or more of these holes. As the plastic material rises in the space between the mold and the shell it fills the holes 52 so that the shell is not weakened and is just as strong after the plastic has hardened as if the hole had never been drilled. If it is necessary to drill any hole 52 below the top level of the facing layer 50, suitable plugs (not shown) are placed therein to prevent the plastic from overflowing onto the back of the shell.

In connection with the foregoing it will be readily appreciated that although the lattice framework 14 may be cured before it is mounted on the shell 44, this is not essential. Under certain circumstances it may be desirable to make the lattice framework 14 and the shell 44 simultaneously and to mount the uncured framework on the shell. Both the framework 14 and shell 44 are then cured simultaneously. The main advantage derived from precuring the framework 14 is that it is in a hard, rigid state at the time the shell 44 is cured and thus tends to hold the latter in shape. Some resins tend to warp or twist somewhat when cured and this tendency is resisted by the frame if it is cured before being mounted on the shell. However, there are other resins that warp or twist only slightly, if at all, when cured; and when these resins are used, the reinforcing framework and the shell can be most easily cured at the same time. Also there are situations where it makes little, if any, difference whether the frame 14 and shell 44 warp somewhat during the curing step, and it is immaterial under these circumstances whether the framework 14 is cured before the shell 44 or simultaneously with the shell.

Whenever a facing layer 50 is to be used, it is desirable always to cure and harden the shell 44 before pouring the outer facing layer, because the framework 14 and shell 44 are essentially strong and rigid after curing and thus effectively resist any tendency for the much thinner surface layer 50 to warp or twist the structure when curing. Under these circumstances the lattice reinforced shell 44 maintains the form assumed upon curing and thus effectively holds the outer layer to absolute dimensional stability. As a consequence there is no opportunity for the surface layer 50 to warp or otherwise pull away from the mold 10, and the male model thus produced conforms exactly to the surface of the mold.

A plastic die (Fig. 10) can be made by employing the steps described above in connection with the male model duplication, but in this case the lattice openings of the reinforcing framework 14 preferably are filled with plastic material 54 to strengthen the structure and to enable it to withstand the high pressures to which dies conventionally are subjected in use. Under these circumstances weight is not so important as in a model duplication and the extra weight imparted by the plastic 54 has little significance. The plastic filler 54 preferably is poured and set before the outer facing layer 50, however, so that any warpage or twisting caused by these relatively large masses of plastic during curing is not transmitted to the facing layer. Holes 56 are then drilled through the die body and liquid, uncured plastic is then poured through these holes to make the facing layer 50. As in the model duplication, sufficient plastic preferably is introduced to entirely fill the holes 56 so that the die is not weakened by their presence. Also, in the case of a die, a flat metal plate 58 is mounted on the framework 14, and this plate conveniently can be fastened to the die by suitable anchors 60 embedded in the plastic material 54. The anchors 60 here shown are rodlike members having enlarged heads 62, and screws 64 extend downwardly through the plate 58 and into suitable internally threaded holes provided in the anchors.

Under certain circumstances it may be desirable to make a reproduction fixture without the reinforcing framework 14, and such a construction is shown in Fig. 13. This construction merely utilizes a shell 44 and a surface layer 50 of the type hereinabove described. The fixture is made exactly in the same way as the fixture shown in Fig. 9, for example, except that the reinforcing lattice framework is omitted. The modified fixture construction offers a fast, inexpensive way of making a fixture that is dimensionally stable whenever the extra strength and rigidity imparted by the framework 14 is not required.

Reference is now had to Fig. 14 which shows still another modified construction for fixtures of the type here under consideration. This construction can be made with or without the reinforcing lattice framework. The framework is omitted in the particular fixture here shown by way of illustration. As shown in the drawings the fixture merely comprises the main shell of the fixture first described. The three layers 38, 40, and 42 are laid in place using plastic strip material 19 exactly as in the shell 44, but in this case the bottom layer 38 is laid directly on the top contour surface 12 of the mold 10. The individual strips in the several layers overlap and the final product is an essentially strong, rigid shell which is suitable for use as a reproduction fixture. This construction can be used in situations where the plastic resin material does not warp when cured or where the warpage is so slight as to be insignificant. The technique illustrated by Fig. 14 is fast and inexpensive and is exceedingly desirable under circumstances where the end product is satisfactory for the particular use at hand.

Having thus described the invention, I claim:

The method of making reproduction fixtures such as dies, models, assembly fixtures, checking fixtures, spotting racks, and the like comprising the steps of covering the surface to be reproduced with a flexible sheet material of a thickness equal to the desired thickness of a surface layer to be provided on the fixture, laying strips of an uncured mastic thermosetting resin material side by side and in successive superposed layers on said sheet material with the strips in each layer disposed transversely with respect to the strips in adjacent layers, curing said resin material, then removing the cured resinous material and stripping away the sheet material from said surface, repositioning the cured resin material above and spaced from said surface, confining the space between said resin layers and said surface, then filling said space with a plastic resin material to provide an outer surface layer on said cured resin layers and in intimate contact with said surface, and then curing the resinous material of said outer layer.

References Cited in the file of this patent

UNITED STATES PATENTS

| | | |
|---|---|---|
| 2,189,154 | Stewart | Feb. 6, 1940 |
| 2,284,929 | Stewart | June 2, 1942 |
| 2,339,433 | Staehle | Jan. 18, 1944 |
| 2,377,393 | Wiley | June 5, 1945 |
| 2,417,586 | Crosley | Mar. 18, 1947 |
| 2,448,114 | Olson et al. | Aug. 31, 1948 |
| 2,452,739 | Fairchild | Nov. 2, 1948 |
| 2,496,665 | Hermanson | Feb. 7, 1950 |
| 2,560,599 | Ryan | July 17, 1951 |
| 2,578,781 | Brundige | Dec. 18, 1951 |
| 2,596,184 | Sutton | May 13, 1952 |
| 2,632,922 | Kish | Mar. 31, 1953 |
| 2,652,595 | Kish | Sept. 22, 1953 |
| 2,682,491 | Hahn | June 29, 1954 |
| 2,697,231 | Strand | Dec. 21, 1954 |

FOREIGN PATENTS

| | | |
|---|---|---|
| 457,096 | Canada | May 31, 1949 |